(No Model.)
J. REICHERT.
SEAT.
No. 594,035. Patented Nov. 23, 1897.
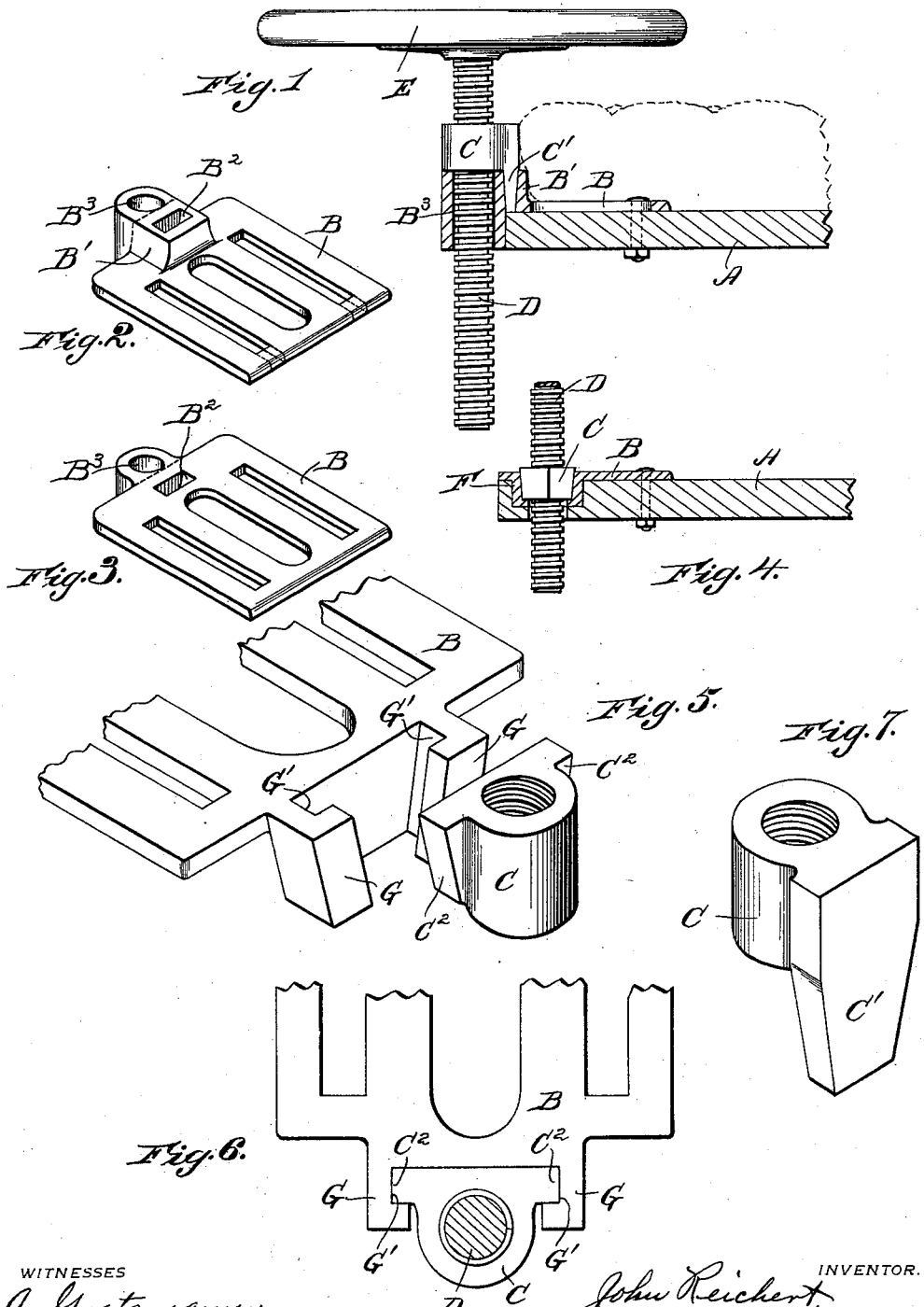

and shown# UNITED STATES PATENT OFFICE.

JOHN REICHERT, OF RACINE, WISCONSIN, ASSIGNOR OF ONE-HALF TO LUCIUS J. ELLIOTT, OF SAME PLACE.

SEAT.

SPECIFICATION forming part of Letters Patent No. 594,035, dated November 23, 1897.

Application filed May 21, 1896. Serial No. 592,407. (No model.)

*To all whom it may concern:*

Be it known that I, JOHN REICHERT, a citizen of the United States, residing at Racine, county of Racine, State of Wisconsin, have invented a certain new and useful Improvement in Seats; and I declare the following to be a full, clear, and exact description of the invention, such as will enable others skilled in the art to which it pertains to make and use the same, reference being had to the accompanying drawings, which form a part of this specification.

My invention relates to new and useful improvements in seats; and it consists in the matters hereinafter described, and pointed out in the appended claims.

The object of my invention is to provide a simple and durable form of seat capable of ready attachment to any suitable support, but is designed more particularly for attachment to the seat-frame of a buggy or other vehicle.

In the accompanying drawings, illustrating my invention, Figure 1 is a view, partly in section and partly in elevation, showing one form of my improved device as applied to the seat-frame of a vehicle. Fig. 2 is a perspective view of the attaching bracket or plate. Fig. 3 is a similar view of a somewhat different form of bracket or plate. Fig. 4 is a view, partly in section and partly in elevation, illustrating a different form of construction. Fig. 5 is a perspective view of a portion of the bracket or plate and a non-rotative nut for detachable engagement therewith. Fig. 6 is a top plan view of the same, showing the spindle which engages with the nut in section. Fig. 7 is a perspective view of the nut shown in Fig. 1.

Referring by letter to the drawings, A designates the seat board or frame of a vehicle.

B designates a supporting bracket or plate, which is secured to the seat board or frame A in any desired or convenient manner, and is arranged to suitably engage with a non-rotative nut C, within which a spindle D has a screw-threaded engagement. A seat E is suitably secured to the upper end of the screw-threaded spindle D, and serves as a third or auxiliary seat for the vehicle when occasion may require.

In adapting the bracket or plate B and the nut C for engagement with each other I prefer to provide one of the parts, conveniently the bracket or plate, with a suitable socket or receptacle for engagement with the other part, conveniently the nut or a projection upon the nut.

In the particular form of construction shown in Figs. 1, 2, and 3 the nut C is provided upon its rear side with a rearwardly-extending projection terminating in a downturned extension C', which is conveniently provided with inclined faces, as in Fig. 1. The bracket B in the form shown in Figs. 1 and 2 has an upwardly-extending portion B', provided with a socket or receptacle B² for engagement with the extension C' upon the nut and having similarly inclined or tapered faces. In the particular form shown in Fig. 3 the upwardly-extending portion B' is omitted and the socket or receptacle B² is formed directly in the plate or bracket itself. In both of these forms of construction the nut C engages by means of its extension C' with the socket or receptacle in the plate and is thereby held in position and prevented from rotation when the device is in operative position upon the seat-frame, but the spindle carrying the seat, together with the nut, is free to be lifted out of engagement with the bracket when the third or auxiliary seat is not needed.

The forms of the bracket or plate shown in Figs. 1, 2, and 3 are provided with sleeves B³ B³ upon their forward or outer edges, through which the spindle D passes, said sleeves forming guides for the spindle, and the upper ends of said sleeves serving to assist in supporting the nut in its engagement with the plates and to prevent undue strain upon the extension C' of the nut.

In the form of construction shown in Fig. 4 the plate B is provided with a socket or receptacle F, extending downward from its upper side and adapted for engagement directly with the nut C, which in this instance is made of angular form, so as to fit within said socket, and in this instance, as in the other forms of construction previously described, the sides or faces of the nut and the sides or faces of the socket are suitably tapered or inclined, so as to insure a proper and close fit of the parts when brought together. In this particular form of construction an aperture is formed centrally in the bottom of the socket F, and a similar aperture is formed in the seat board or frame A to permit the passage of the spindle D therethrough.

In the particular form of construction shown in Figs. 5 and 6 the bracket or plate B is provided with forwardly-extending flanges or ribs G G, upon the inner faces of which are provided suitable guides or ways G' G', and the nut C is provided with laterally-extending ribs $C^2$ $C^2$ for engagement within said guides or ways G' G'. In this form of construction the sides of the guides or ways and the sides of the ribs $C^2$ upon the nut are suitably tapered or inclined, so as to insure a proper engagement of the parts when brought together.

If desired, in the forms of construction shown in Figs. 1, 2, and 3 the sleeve $B^3$ may be left off of the plate or bracket B, as is indicated by the dotted lines in Figs. 2 and 3, and the nut C, together with the spindle and third or auxiliary seat, supported entirely by the engagement of the extension C' with the socket $B^2$. If desired also, the bracket or plate B may be made readily detachable from the seat-frame by continuing the slots with which the bolts engage to the rear edge of the plate, so that when desired to remove the plate the bolts may be slightly loosened and the plate then slipped forward from beneath the bolt-heads. By this means the plate may be readily removed from the seat-frame when desired, so as to leave the seat-frame entirely free from any projecting parts. It follows from the foregoing that with either of the forms of construction shown and described the auxiliary or third seat is readily attachable to and detachable from the permanent seat of the vehicle, and that in order to properly engage the third seat therewith it is only necessary to place the non-rotative nut in engagement with the supporting bracket or plate when the height of the seat which is carried by the spindle may be varied as desired by rotation of the spindle within the nut in an obvious manner.

By means of my improvement I am enabled to provide a very simple and durable form of auxiliary seat capable of application to seats of vehicles or to other objects to which it may be desirable to connect such a seat.

By modification of the shape of the bracket or plate B my improved seat may be readily applied to many devices or supports other than the permanent seats of vehicles.

Having thus described my invention, what I claim as new, and desire to secure by Letters Patent of the United States, is—

1. A bracket or plate attachable to a suitable support and provided with a socket or receptacle, a non-rotative nut having a correspondingly-shaped portion or portions for detachable engagement within said socket or receptacle, and a spindle having screw-threaded engagement with said nut, and provided at its upper end with a seat.

2. A bracket or plate attachable to a suitable support and provided with a socket or receptacle having inclined sides or faces, a non-rotative nut provided with a correspondingly-shaped portion or portions for detachable engagement with said socket or receptacle, and a spindle having screw-threaded engagement with said nut, and provided at its upper end with a seat.

3. A bracket or plate attachable to a suitable support and provided with a socket or receptacle, a non-rotative nut provided with one or more projections for detachable engagement with said socket or receptacle, and a spindle having screw-threaded engagement with said nut, and provided at its upper end with a seat.

4. A bracket attachable to a suitable support and provided with a socket or receptacle having inclined sides or faces, a non-rotative nut provided with one or more projections having correspondingly-inclined sides or faces, and adapted for detachable engagement with said socket or receptacle, and a spindle having screw-threaded engagement with said nut, and provided at its upper end with a seat.

5. A bracket or plate attachable to a suitable support, a nut for detachable engagement therewith, one of the parts being provided with a socket or receptacle having inclined or tapered sides, and the other with a correspondingly-shaped projection for engagement within said socket or receptacle, and a spindle having screw-threaded engagement within the nut, and provided at its upper end with a seat.

6. In an auxiliary seat, a supporting bracket or plate for engagement with a detachable non-rotative nut carrying a spindle and seat, said plate being provided with slots for the reception of bolts for securing it to a support, and said slots being extended to the rear edge of the bracket or plate.

In testimony whereof I sign this specification in the presence of two witnesses.

JOHN REICHERT.

Witnesses:
JOHN E. WILES,
L. J. ELLIOTT.